No. 707,152. Patented Aug. 19, 1902.
R. MURPHY.
PLANTER.
(Application filed July 12, 1901.)
(No Model.) 3 Sheets—Sheet 1.

Witnesses
Inventor
Robert Murphy
By
Attorneys

No. 707,152. Patented Aug. 19, 1902.
R. MURPHY.
PLANTER.
(Application filed July 12, 1901.)
(No Model.) 3 Sheets—Sheet 2.

Witnesses
Inventor
Robert Murphy
By
Attorneys

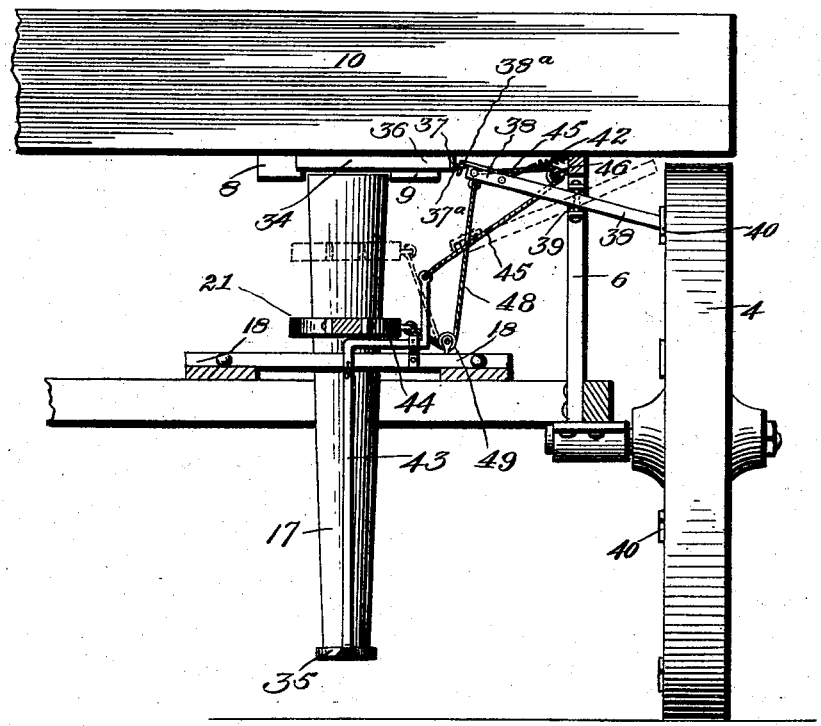

UNITED STATES PATENT OFFICE.

ROBERT MURPHY, OF CANISTEO, NEW YORK.

PLANTER.

SPECIFICATION forming part of Letters Patent No. 707,152, dated August 19, 1902.

Application filed July 12, 1901. Serial No. 67,994. (No model.)

*To all whom it may concern:*

Be it known that I, ROBERT MURPHY, a citizen of the United States, residing at Canisteo, in the county of Steuben and State of New York, have invented certain new and useful Improvements in Planters; and I do declare the following to be a full, clear, and exact description of the invention, such as will enable others skilled in the art to which it appertains to make and use the same.

My invention relates to that class of planters wherein the feeding of the seed, grain, &c., is governed by the movement of a reciprocating gate or slide actuated by the revolution of bearing-wheels as the planter is moved and wherein the planting mechanism is adapted to be raised in order to afford greater facilities for transportation, my invention being especially applicable to the planting of potatoes; and for the purpose of making such a machine which will be cheap, efficient, and durable my invention consists in the construction, arrangement, and combination of the several parts of which it is composed, as will be hereinafter more fully described and claimed.

Figure 1:
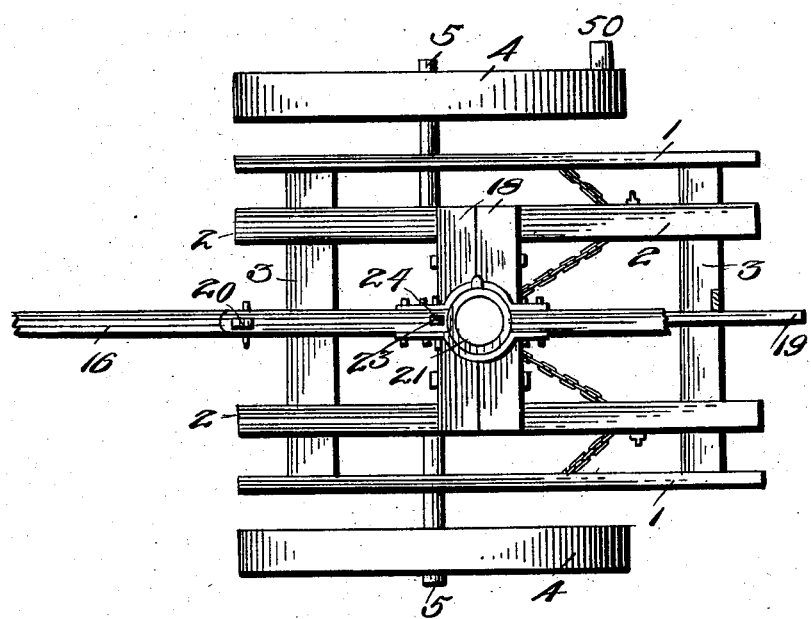
Figure 2:
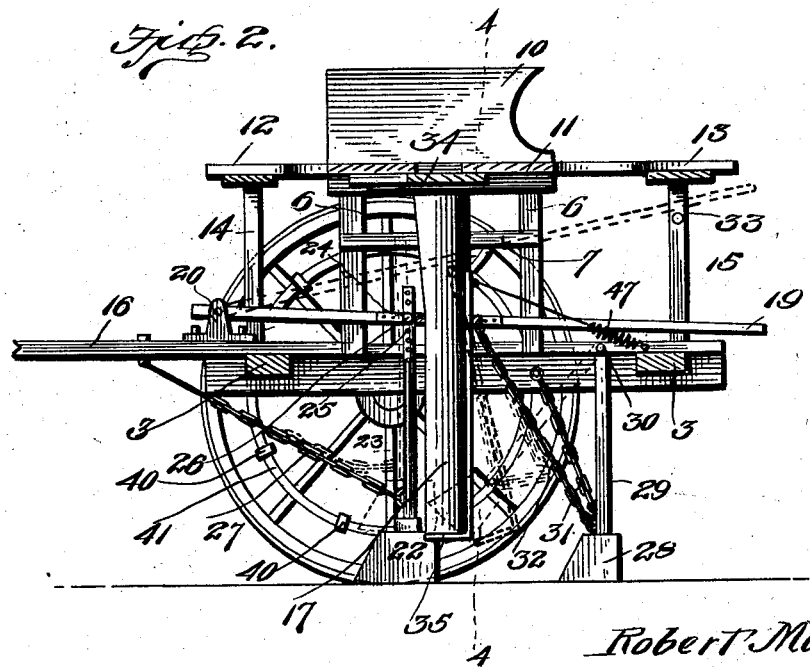
Figure 3:
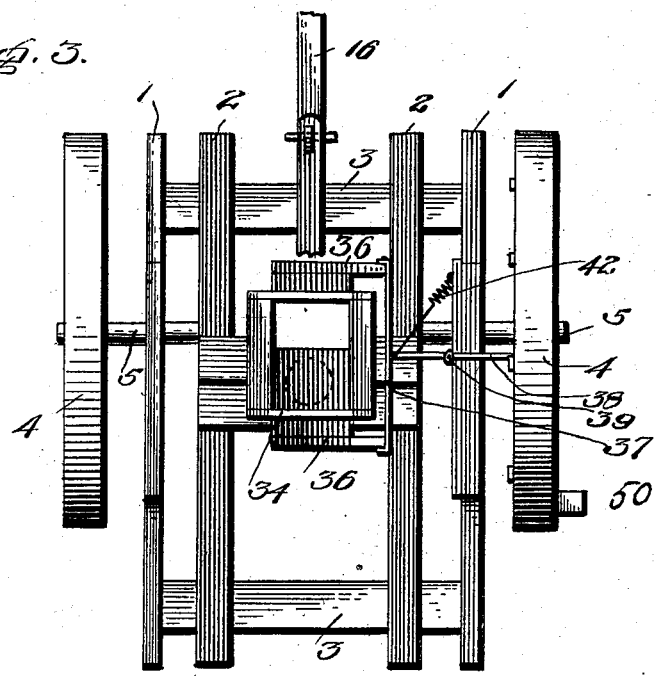
Figure 4:
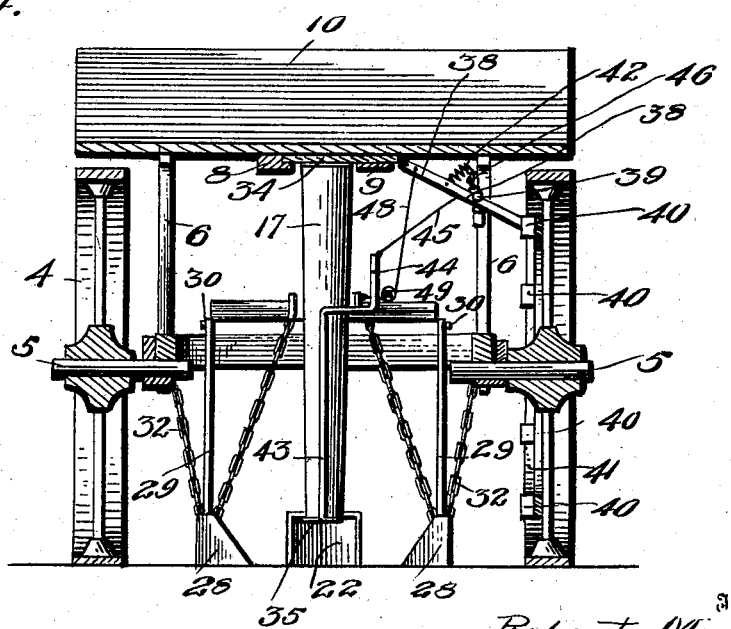

In the accompanying drawings, Figure 1 is a top plan view of a planter constructed in accordance with my invention, the hopper and its supporting-frame and the valve-actuating mechanism being removed. Fig. 2 is a central vertical longitudinal section of the complete machine. Fig. 3 is a view similar to Fig. 1, showing the hopper removed, but illustrating the construction of the slide-valve and means for operating the same. Fig. 4 is a central vertical cross-section of the device taken on line 4 4 of Fig. 2. Fig. 5 is a fragmentary rear elevation, partly in section, showing the connections between the valves and levers.

Like reference-numerals designate corresponding parts throughout the several views.

The main frame consists of two longitudinal side bars 1, the two intermediate longitudinal bars 2, and the transverse end pieces 3, carried by the wheels 4, having a broad tread, which wheels are mounted upon the axles 5, projecting from the outer side of each of the side pieces 1. An auxiliary frame, consisting of standards 6, connected by a cross-brace 7, rising from each of the longitudinal bars 2 and connected at the top by the top pieces 8 and 9, supports the feed box or hopper 10, which occupies a central position upon the frame, and the bottom 11 of this hopper is preferably extended toward the front and rear and properly shaped to form a driver's seat 12 and an operator's seat 13, which are respectively braced by and supported upon the seat-posts 14 and 15, rising from the front and rear cross-pieces 3. The tongue or pole 16 extends longitudinally to the rear of the frame and is suitably secured to the said front and rear cross-pieces 3. The box or hopper 10 serves as a receptacle for the fertilizer, seeds, potatoes, &c., which are to be fed through the conducting tube or spout 17 to the ground. The spout 17 is rigidly held and clamped in position upon the frame by transverse clamping-pieces 18, which are suitably connected to each other and the intermediate longitudinal bars 2. A lever 19 is pivoted at its forward end to a bracket 20, mounted upon the tongue 16, and extends rearwardly therefrom and is provided at a point at or about midway of its length with a collar or yoke 21, which surrounds the said conducting tube or chute 17. The furrow-opener 22 is disposed immediately in advance of the tube or spout 17 and is provided with an upwardly-extending post or arm 23, which projects at its upper end through a slot 24, formed in the lever 19 adjacent to the collar or yoke 21 and provided with a longitudinal series of apertures 25 for the passage therethrough of a securing-pin 26, which is adapted to be fitted transversely in openings formed in the lever 19 to adjustably connect the said post or arm thereto, whereby the furrow-opener may be adjusted vertically as desired. A chain 27 connects the furrow-opener with the tongue 16 and constitutes a flexible connection whereby said furrow-opener is steadied and braced and also permitted to be raised or lowered for adjustment. The hiller or furrow-covering plows 28 are located in the rear of the spout 17 and upon opposite sides of the central line of same and the furrow-opener and are provided with upwardly-extending posts or arms 29, which are pivotally connected at their upper ends by pins or bolts 30 to the intermediate longitudinal bars 2, whereby they are adapted to swing in the arc of a circle in a direction longitudinally of the frame. The plows are connected to the frame and held from rearward movement by the stay-chain 31 and are also connected with the collar or yoke 21 of the lever 19 by chains 32, so that when said lever is elevated the chains 32 will be drawn upon to move the plows upwardly and forwardly to the dotted-line position shown in Fig. 2 and throw them out of operation. At the same time it will be understood the furrow-opener 22 will be elevated to the dotted-line position shown in Fig. 2 and thrown out of operation by reason of the connection of its arm 23 with the lever 19, whereby the operating parts may be raised for convenience in transporting the planter from place to place and until the lever is disengaged and lowered again to throw them into operation. The rear end of the lever 19 is suitably shaped to form a handle, which is disposed so as to be conveniently manipulated by the operator from the seat 13, and said lever when elevated is adapted to be held in such position by means of a pin or stop 33, fitted in or suitably applied to the seat-post 15.

The feed of the seed, fertilizer, or potatoes from the hopper and through the tube 17 to the ground is controlled by means of valves 34 and 35, arranged to open and close the top and bottom ends of said tube. The valve 34 is slidably mounted in guides or ways formed in the frame-pieces 8 and 9 and is provided at its opposite ends with arms 36, connected at their free ends by means of flexible straps 37 to the inner end of a vibrating operating-lever 38, pivoted at 39 to one of the standards 6, rising from the intermediate longitudinal side bars 2. The connection between said lever and straps is preferably made by providing the lever with a hook 38$^a$ to engage an eye 37$^a$ uniting said straps, thus making the lever detachable from the straps. The lever 38 is adapted to swing in an arcuate path longitudinally of the planter, and its outer end projects into the path of the lugs 40, suitably secured or formed upon a rim 41, fastened upon the inner side of one of the carrying-wheels 4. As the wheels turn upon the forward movement of the planter these lugs 40 at regular periods or intervals come into contact with the outer projecting end of the lever 38 and force the same forwardly, thereby vibrating the lever and sliding the valve through the medium of flexible straps 37 to its open position, whereupon a definite quantity of seed from the hopper 10 will be allowed to pass through the feed-opening in the bottom of the hopper and drop down into the tube or spout 17. After the lug 40, which contacts with the lever, has moved the same to its fullest extent said lug clears the lever, and the lever is then retracted to its normal position by a retracting-spring 42, whereby the said slide-valve 34 is closed.

The valve 35, which controls the outlet of the seed at the bottom of the spout 17, is carried by an operating-lever 43, which projects upwardly upon the rear side of the spout 17 and has an angularly-bent L-shaped upper end 44, the right-angular portion of which is pivoted to one of the transverse clamps 18 or to some other suitable part of the frame, while the vertical extremity of said L-shaped end has connected thereto one end of a flexible strap 45, which passes around a pulley 46, mounted upon the adjacent standard 6, and thence extends to and is connected with the inner end of the vibrating lever 38. By this construction it will be seen that when said lever 38 is operated by a lug 40 both valves 34 and 35 will be simultaneously opened, and that when the lever is restored to its normal position both valves will be simultaneously closed, the closing of valve 35 being effected by means of a retracting-spring 47, (shown in Fig. 2,) connected to the lever 43 and to some fixed part of the frame. As a result of this construction it will be readily understood that at the outset when the valves are opened the seed resting on the valve 34 will be allowed to drop down into the spout 17, but are prevented from discharging through the spout by the valve 35, which closes before said seeds can pass through said spout, and that at all times subsequently during the operation of planting the valve 35 on opening will allow the seed resting thereon to drop through to the ground to be planted and will then close to prevent the seed which have been permitted to pass into the spout 17 by the opening of the valve 34 from discharging, the operation of the valves being so timed that the valves are adapted to close after having been opened before the seed passing through the valve 34 can pass through the lower end of the spout 17 to the ground. By this means it will be seen that a potato or charge of seed will be held by the bottom valve during the entire operation of planting and will be immediately discharged and deposited into the furrow upon the opening of said valve, thus insuring regular and uniform planting. Attached to the inner end of the lever 38 is a cord, strap, or chain 48, which passes downward and over a pulley 49 upon the frame and is connected with the collar or yoke 21, so that when the lever 19 is raised to throw the furrow-opener and hillers out of operation the outer end of said lever 38 after the hook 38$^a$ has been released by the hand will also be moved out of the path of the lugs 40 upon the revolving wheel, thus cutting off the feed as desired when moving the planter and cultivator from place to place. It will of course be understood that in this operation of the parts the hook 38$^a$ is first disengaged by the operator, so that the lever 38 will be free to be retracted when the lever 19 is raised.

Instead of forming or securing the lugs upon the rim 41 for actuating the trip-lever I may form said lugs directly upon the wheel. The use of the rim or ring 41, however, is deemed preferable, as several of such rings may accompany each machine and have the lugs differently spaced thereon, so as to afford a ready means for regulating the distance between the successive hills.

A marker 50 is applied to one of the wheels 4 to come into contact with the surface of the ground and leaves an imprint as a guide for cross-furrowing.

Having thus fully described my invention, what I claim, and desire to secure by Letters Patent, is—

1. In a planter, the combination of a hopper, a feed-spout, valves at the top and bottom of the spout, a vibrating lever for imparting a sliding movement to the upper valve, a swinging lever connected to the lower valve, means for operating said vibrating lever, a connection between the two levers for effecting the simultaneous operation of the valves, means auxiliary to and connected with said levers for simultaneously retracting the same, and further means for throwing said levers and valves out of operation, substantially as described.

2. In a planter, the combination with a frame and hopper, of a feed-spout, upper and lower valves for controlling the feed of seed from the hopper to the spout and from said spout to the ground, a vibrating lever for imparting a sliding movement to the upper valve, a swinging lever connected to the lower valve, means for vibrating said vibrating lever, a connection between the two levers for operating the valves in unison, means auxiliary to said levers for automatically and simultaneously retracting the same, a furrow-opener, furrow-coverers, a lever for simultaneously throwing said furrow-opener and furrow-coverers into and out of operation, and a connection between said lever and the vibrating lever for throwing said vibrating lever into and out of operation simultaneously with the furrow opener and coverers, substantially as described.

3. In a planter, the combination with a frame, of a lever pivoted thereto, a furrow-opener adjustably connected with the lever, a flexible connection between said furrow-opener and a fixed part of the planter, furrow-coverers pivoted to the frame, flexible connections between said furrow-coverers and the frame to limit the rearward movement of said coverers, flexible connections between the coverers and the lever, whereby when said lever is operated the furrow openers and coverers will be simultaneously thrown into and out of operation, and means for holding the said lever elevated, substantially as described.

4. In a planter, the combination with a frame and hopper, of a feed-spout, a slide-valve between the hopper and the spout, a swinging valve at the lower end of the spout, a vibrating lever pivoted to the frame and connected with the slide-valve, a swinging lever connected with the swinging valve, a connection between the two levers for effecting the simultaneous operation of the valves, means for actuating the vibrating lever in one direction, springs for automatically retracting the levers, furrow opening and covering devices, and an operating-lever for simultaneously throwing said furrow opening and covering devices and the vibrating lever into and out of operation, substantially as described.

In testimony whereof I have hereunto set my hand in presence of two subscribing witnesses.

ROBERT MURPHY.

Witnesses:
GARRET F. SPEER,
CHARLES C. BURRELL.